(12) United States Patent
Freeman et al.

(10) Patent No.: US 8,285,680 B2
(45) Date of Patent: Oct. 9, 2012

(54) INDIVIDUAL OBJECT RESTORE

(75) Inventors: Bryan Wayne Freeman, San Jose, CA (US); Alexei Kojenov, Beaverton, OR (US); Joanne T. Nguyen, Saratoga, CA (US); Delbert Barron Hoobler, III, Horseheads, NY (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/350,840

(22) Filed: Jan. 8, 2009

(65) Prior Publication Data

US 2010/0174683 A1    Jul. 8, 2010

(51) Int. Cl.
*G06F 17/30* (2006.01)

(52) U.S. Cl. .................. 707/640; 707/655; 707/716

(58) Field of Classification Search .................. 707/650, 707/638, 640, 655, 716; 705/1; 709/225; 711/148, 173
See application file for complete search history.

(56) References Cited

U.S. PATENT DOCUMENTS

| | | | | |
|---|---|---|---|---|
| 5,649,196 A | * | 7/1997 | Woodhill et al. ............. | 711/148 |
| 5,819,292 A | * | 10/1998 | Hitz et al. ..................... | 707/655 |
| 5,907,672 A | * | 5/1999 | Matze et al. ................. | 714/6.13 |
| 6,070,170 A | * | 5/2000 | Friske et al. ................. | 707/716 |
| 6,098,074 A | * | 8/2000 | Cannon et al. ............... | 707/716 |
| 6,253,300 B1 | * | 6/2001 | Lawrence et al. ............ | 711/173 |
| 6,457,015 B1 | * | 9/2002 | Eastham ....................... | 706/45 |
| 6,574,591 B1 | * | 6/2003 | Kleiman et al. ............. | 707/655 |
| 7,529,811 B2 | * | 5/2009 | Thompson .................... | 709/219 |
| 7,743,028 B1 | * | 6/2010 | Stringham et al. ........... | 707/646 |
| 7,761,456 B1 | * | 7/2010 | Cram et al. .................. | 707/754 |
| 7,774,315 B1 | * | 8/2010 | Galker ......................... | 707/644 |
| 7,885,938 B1 | * | 2/2011 | Greene et al. ................ | 707/674 |
| 8,166,101 B2 | * | 4/2012 | Shah ............................ | 709/203 |
| 2003/0065780 A1 | * | 4/2003 | Maurer et al. ................ | 709/225 |
| 2003/0182326 A1 | * | 9/2003 | Patterson ..................... | 707/640 |
| 2003/0217082 A1 | * | 11/2003 | Kleiman et al. ............. | 707/640 |
| 2004/0204949 A1 | * | 10/2004 | Shaji et al. ................... | 705/1 |
| 2005/0050054 A1 | * | 3/2005 | Clark et al. .................. | 707/802 |

* cited by examiner

*Primary Examiner* — Shahid Alam
(74) *Attorney, Agent, or Firm* — Zilka-Kotab, PC

(57) ABSTRACT

A method for restoring an object comprises receiving a request to restore an object. Also, the method includes outputting a representation of available backup files and receiving a selection of at least one of the available backup files. Further, the method comprises restoring at least one of the selected backup files into a temporary location and mounting at least one of the restored backup files as a server. In addition, the method includes outputting a representation of available objects from the server and receiving a selection of at least one of the available objects to be restored from the server. Also, the method includes copying one or more selected objects from the server into an Active Directory.

8 Claims, 2 Drawing Sheets

INDIVIDUAL OBJECT RESTORE

BACKGROUND

The present invention relates to the restoring of objects, and more particularly, this invention relates to the restoring of individual objects, including object data and object attributes.

The current version of Tivoli Storage Manager (TSM) Client (5.5.0) includes support for backup and restore of Microsoft Active Directory (AD) on a Windows 2003 Domain Controller (DC) server as part of the System State. In order to restore the AD, the Active Directory Domain Controller must be rebooted into Active Directory Restore mode. The AD can only be restored with the other bootable components. In other words, the whole System State needs to be restored.

TSM restore does not support any granularity for Active Directory; the entire AD most be restored to recover a single object. Fortunately, there are usually more than one Active Directory controllers who replicate each other's data. When one DC is restored to an older state, it pulls all changes from other DCs, so an older restore won't overwrite the newer data. This is called non-authoritative restore.

When a backup version needs to overwrite current data, a technique called authoritative restore is used. A certain command line utility (ntdsutil.exe) can be used in this case to authoritatively restore AD's sub-trees or even leaf objects.

Although individual object restore is currently possible using (ntdsutil.exe), it has a number of limitations including: requiring the domain controller to be reboot into a special mode, and then reboot back to the normal mode after restore is done; requiring the entire System State to be restored even if only an AD is to be restored; involving a number of manual steps; and not being integrated within TSM (as it requires use of external utilities, manual copying of the files, etc.).

Therefore, it would be advantageous to allow restoration of only those desired files and/or file attributes and data, while keeping the server online and accessible.

SUMMARY

A method for restoring an object comprises receiving a request to restore an object. Also, the method includes outputting a representation of available backup files and receiving a selection of at least one of the available backup files. Further, the method comprises restoring at least one of the selected backup files into a temporary location and mounting at least one of the restored backup files as a server. In addition, the method includes outputting a representation of available objects from the server and receiving a selection of at least one of the available objects to be restored from the server. Also, the method includes copying one or more selected objects from the server into an Active Directory.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 2A is a simplified schematic diagram of a system according to one embodiment.

DETAILED DESCRIPTION

Figure 1:
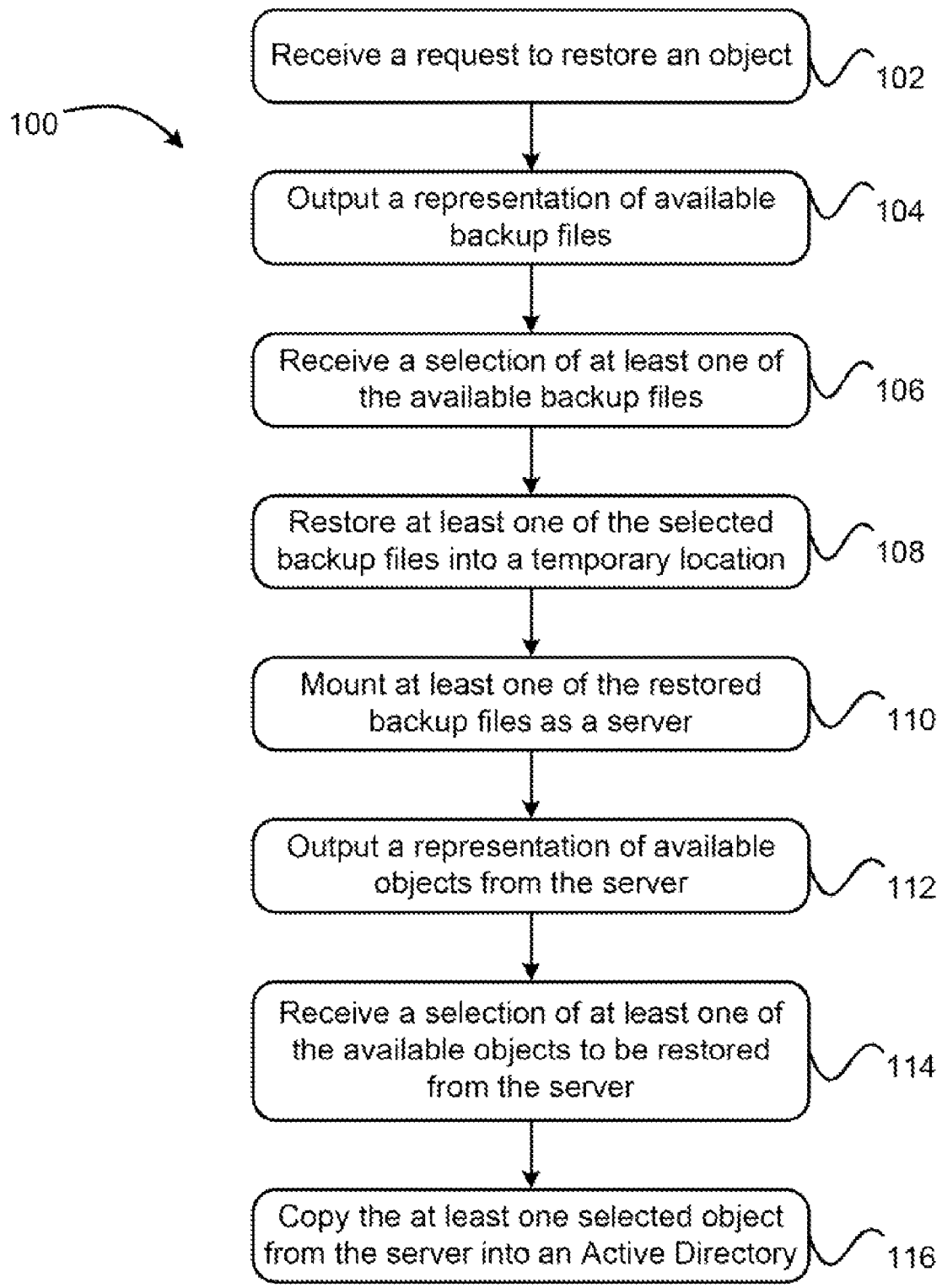
FIG. 1 is a flow diagram of a method according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes systems and methods that allow restoration of individual deleted objects from backup files, without requiring a full restore of all files from a data backup. Various embodiments overcome many of the limitations of the existing restore techniques and provide a user with an easy and transparent way to enumerate and restore individual objects from a full database backup.

In one general embodiment, a method for restoring an object comprising receiving a request to restore an object; outputting a representation of available backup files; receiving a selection of at least one of the available backup files; restoring at least one of the selected backup files into a temporary location; mounting at least one of the restored backup files as a server; outputting a representation of available objects from the server; receiving a selection of at least one of the available objects to be restored from the server; and copying one or more selected objects from the server into an Active Directory.

In another general embodiment, a system comprises a processor and a computer-readable medium. The computer-readable medium has computer usable program code embodied therewith, which when executed by the processor causes the processor to receive a request to restore an object and search for a tombstone associated with the object, the tombstone being any deleted or undeleted file associated with the object to be restored, wherein if the object tombstone is found, the processor is caused to reanimate the object from the object tombstone. If the object tombstone is not found or upon receiving a request to restore from backup, the processor is caused to output a representation of available backup files; receive a selection of at least one of the available backup files; restore at least one of the selected backup files into a temporary location; mount at least one of the restored backup files as a server; output a representation of available objects from the server; receive a selection of at least one available object to be restored from the server; and copy one or more selected objects from the server into an Active Directory.

In yet another general embodiment, a computer program product for restoring an object comprises a computer usable medium having computer usable program code embodied therewith, the computer usable program code comprising: computer usable program code configured to receive a request to restore an object; computer usable program code configured to search for a tombstone associated with the object, wherein if the object tombstone is found or upon receiving a request to restore from backup, reanimating the object from the object tombstone. If the object tombstone is not found, the computer program product comprises computer usable program code configured to output a representation of available backup files, to receive a selection of at least one of the available backup files, to restore at least one of the selected backup files into a temporary location on a domain controller, to mount at least one of the restored backup files as a lightweight directory access protocol (LDAP) server, to output a representation of available objects from the LDAP server, to receive a selection of at least one of the available objects from the LDAP server to be restored, and to copy one or more selected objects from the LDAP server into an Active Directory.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In some particularly preferred embodiments, Tivoli Storage Manager (TSM) storage infrastructure may be combined with the use of the operating system (OS) vendor provided utilities to achieve individual object restore granularity while the domain controller may continue to be accessible online. This type of functionality may overcome many of the limitations of the existing restore techniques and might provide a user with an easy and transparent way to enumerate and restore individual objects from a full database backup.

FIG. 1 illustrates a flow chart of a method 100 according to one embodiment. As an option, the present method 100 may be implemented in the context and functionality of a computer or computer system. Of course, the method 100 may be carried out in any desired environment. It should be noted that the aforementioned definitions may apply during the present description.

With continued reference to FIG. 1, in operation 102, a request to restore an object may be received. Any type of request may be received, including a user initiated request; a request generated by a program, server, system, etc., either automatically or in response to some other action, possibly by the user; etc. An object may be a program, file, database, reference, or any other code that can be stored on and/or deleted from a system, computer, server, etc.

In operation 104, a representation of available backup files may be output. This representation may be a list, a chart, an outputted file, such as a database file or excel spreadsheet, etc. The representation may be output to any other system, program, computer, display, etc.

In operation 106, a selection of at least one of the available backup files may be received. This selection may be made by a user, a program, a system, a server, etc. The entity that selects the backup file may be the entity which is executing this method 100, or any other entity, such as a system, process, program, server, etc.

In operation 108, at least one of the selected backup files may be restored into a temporary location. For example, the selected backup file may be restored from a deleted version of an Active Directory which was stored in the backup file. The temporary location may be on a domain controller.

In operation 110, at least one of the restored backup files may be mounted as a server. For example, a restored backup file may be mounted as a lightweight directory access protocol (LDAP) server, such that data may be transferred from the temporary location into an Active Directory.

In operation 112, a representation of available objects may be output from the server. This representation may be a list, a chart, an outputted file, such as a database file or excel spreadsheet, etc. The representation may be output to any other system, program, computer, display, etc. For example, if there are three files which were stored in the backup file, all three files will be output, such that one or more of the files may be chosen to be restored.

In operation 114, a selection of at least one of the available objects to be restored may be received. This selection may be made by a user, a program, a system, a server, etc. The entity that selects the backup file may be the entity which is executing this method 100, or any other entity, such as a system, process, program, server, etc. In a preferred embodiment, a user may select which object to restore from a list of available objects displayed as a graphical user interface (GUI).

In operation 116, one or more selected objects may be copied from the server into an Active Directory. This may allow the computer, program, server, etc., to continue processing with the now restored object in place, possibly overwriting another version of the object that was undesirable for some reason, such as contamination, partial or foil deletion, corruption, etc.

FIG. 2A shows a simplified schematic diagram of a system according to one embodiment. A system 200 may comprise a processor 202 and a computer-readable medium 204. In FIG. 2A, the computer-readable medium 204 is shown as a DVD-ROM, which may be inserted into a disk drive capable of interpreting the data on the DVD-ROM and the system 200 is shown as a desktop computer. However, this is for explanatory purposes only, and any computer-readable medium and system may be used, and this in no way limits the scope of the invention.

Figure 2B:
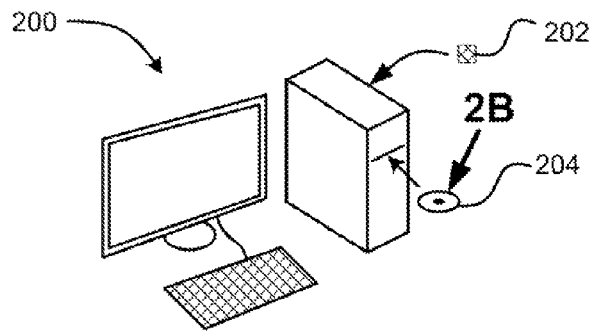
FIG. 2B is a flow diagram of a method according to one embodiment.
Figure 2B:
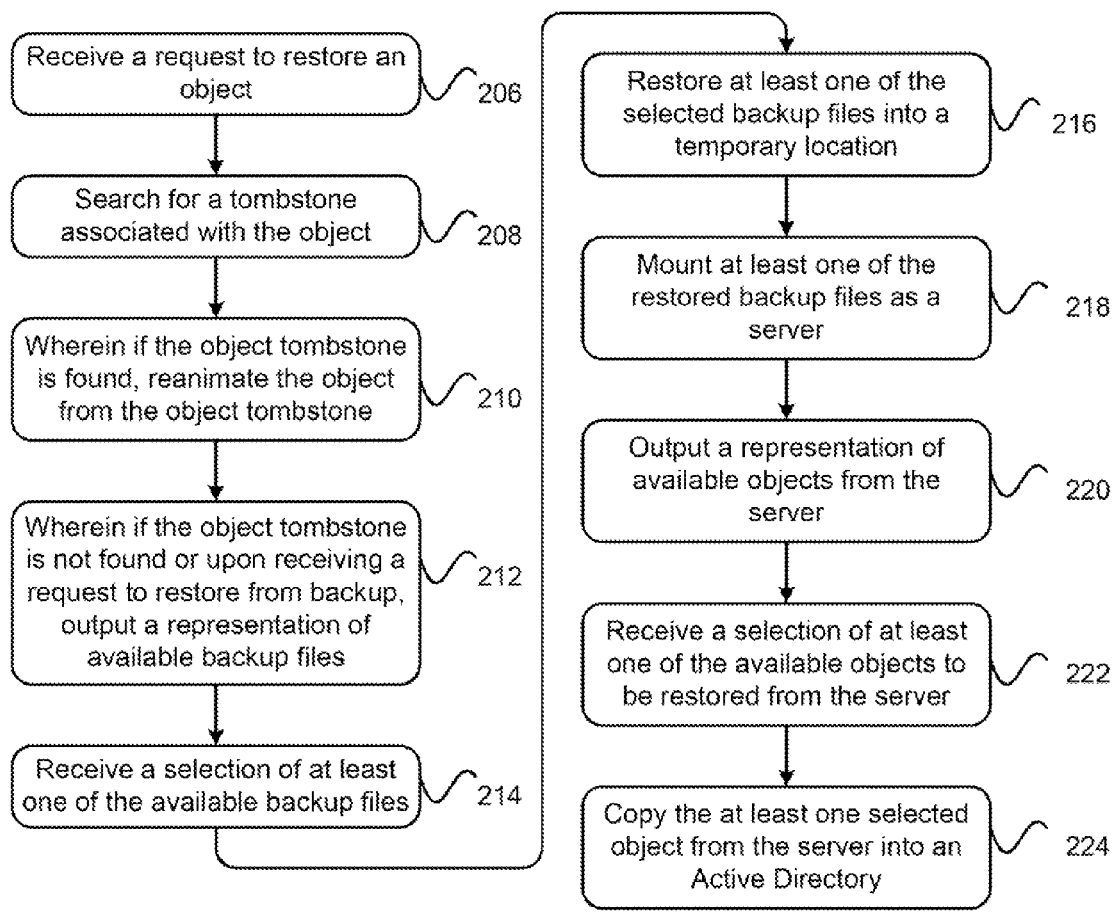

FIG. 2B illustrates a flow chart of a method 250 according to one embodiment, which may comprise computer usable code embodied on the computer-readable medium 204. As an option, the present method 250 may be implemented in the context and functionality of a computer or computer system. Of course, the method 250 may be carried out in any desired environment. It should be noted that the aforementioned definitions may apply during the present description.

With continued reference to FIG. 2B, in operation 206, a request to restore an object may be received. Any type of request may be received, including a user initiated request; a request generated by a program, server, system, etc., either automatically or in response to some other action, possibly by the user; etc. An object may be a program, file, database, reference, or any other code that can be stored on and/or deleted from a system, computer, server, etc.

In operation 208, a tombstone associated with the object may be searched for. This tombstone may be any deleted or undeleted file associated with the object to be restored, as long as it contains some data that may be useful in restoring the object.

In operation 210, if the object tombstone is found, the object may be reanimated from the object tombstone. Reanimation thus may include reinstatement of the object and any data associated therewith, e.g., pointers, registry entries, etc. in all appropriate locations. Moreover, the object may then be available for access, retrieval, and/or use in a manner similar to the way it was used before it was deleted. For example, if a file was deleted, and the file is still present in the data storage system, such as a hard disk, server-based storage system, etc., then the file may be reanimated from the file still existing in the data storage system. Preferably, upon reanimation, the reanimated file is available as if it were never deleted. In another example, if the file is stored on a server, but has been deleted from a local computer, the file may be reanimated on the local computer based on the stored copy found on the server. In one approach, the file may be copied to the local computer from the server and reanimated on the local computer in a manner similar to that set forth above.

In operation 212, if the object tombstone is not found or upon receiving a request to restore from backup, a representation of available backup files may be output. This representation may be a list, a chart, an outputted file, such as a database file or excel spreadsheet, etc. The representation may be output to any other system, program, computer, display, etc.

In operation 214, a selection of at least one of the available backup files may be received. This selection may be made by a user, a program, a system, a server, etc. The entity that selects the backup file may be the entity which is executing this method 100, or any other entity, such as a system, process, program, server, etc.

In operation 216, at least one of the selected backup files may be restored into a temporary location. For example, the selected backup file may be restored from a deleted version of an Active Directory which was stored in the backup file. In a preferred embodiment, the temporary location may be on a domain controller.

In operation 218, at least one of the restored backup files may be mounted as a server. For example, a restored backup file may be mounted as a lightweight directory access protocol (LDAP) server, such that data may be transferred from the temporary location into an Active Directory.

In operation 220, a representation of available objects may be output from the server. This representation may be a list, a chart, an outputted file, such as a database file or excel spreadsheet, etc. The representation may be output to any other system, program, computer, display, etc. For example, if there are three files which were stored in the backup file, all three files will be output, such that one or more of the files may be chosen to be restored.

In operation 222, a selection of at least one of the available objects to be restored may be received. This selection may be made by a user, a program, a system, a server, etc. The entity that selects the backup file may be the entity which is executing this method 100, or any other entity, such as a system, process, program, server, etc. In a preferred embodiment, a user may select which object to restore from a list of available objects displayed as a graphical user interface (GUI).

In operation 224, the at least one selected object may be copied from the server into an Active Directory. This may allow the computer, program, server, etc., to continue processing with the now restored object in place, possibly overwriting another version of the object that was undesirable for some reason, such as contamination, partial or full deletion, corruption, etc.

In some embodiments, when a request to restore from backup is received, a tombstone search may be performed. If a tombstone is found, the tombstone can be reanimated. The reanimated file may then be updated with object attributes and/or object data from a backup file. This may allow an object which is restored from a tombstone to also be updated with any stored updated information which might be included in a backup file, so that the most recent saved version may be restored. Also, by allowing only certain object attributes and/or data to be selected to be restored, portions of a file which may be damaged can be restored, without affecting the entire file.

In some preferred embodiments, backup files may be Tivoli Storage Manager (TSM) flies.

In some approaches, the server may be a lightweight directory access protocol server (LDAP), such that commonly accessible utilities, file structures, programs, etc., may be used with any method described herein.

In some preferred approaches, the output steps may comprise using a graphical user interface (GUI). In addition, the GUI may be used to display a list, chart, graph, spreadsheet, etc., of the available backup files and/or the available objects to be restored. In this way, for example, a user can select which of a number of options to choose from a list format, enhancing the user's ability to determine which, when, and how to restore objects from a backup file.

In some preferred embodiments, the mounting of the restored backup file(s) may further comprise using a utility file from a third-party vendor, such as the utility file dsamain.exe, from MICROSOFT.

In preferred embodiments, the server may stay online and accessible throughout the object restore, such that access to data and information is substantially unaffected by the restoring of an object described herein.

In some embodiments, the receiving of the selection of available objects to be restored may further comprise the receiving of a selection of object attributes and/or object data to be restored. For example, when the available objects are output to a user through a GUI, possibly in a list format, the user may further select only certain attributes and/or data to be restored from individual objects, such that the entire object is not affected by the restoring method, only the portion chosen in the received selection. Of course, this description is for explanatory purposes only, and a user is not required to make any selections for any method described herein to operate fully. In addition, a computer, system, server, etc., may make a selection as to which portions of the object should be restored, and this selection may be received in order to carry out the restore.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a processor;
   a computer-readable medium, the computer-readable medium having computer usable program code embodied therewith, which when executed by the processor causes the processor to:
      receive a request to restore an object;
      search for a tombstone associated with the object,
      wherein if the object tombstone is found, reanimate the object from the object tombstone,
      wherein if the object tombstone is not found or upon receiving a request to restore from backup:
         output a representation of available backup files;
         receive a selection of at least one of the available backup files;
         restore at least one of the selected backup files into a temporary location;
         mount at least one of the restored backup files as a server;
         output a representation of available objects from the server;
         receive a selection of at least one of the available objects to be restored from the server; and
         copy the at least one selected object from the server into an Active Directory.

2. The system of claim 1, wherein the reanimating the object from the object tombstone further comprises:
   searching for a backup file; and
   updating the object with at least one of an object attribute and an object data from the backup file.

3. The system of claim 1, wherein the at least one selected backup file is a Tivoli Storage Manager (TSM) backup file.

4. The system of claim 1, wherein the output steps comprise using a graphical user interface, wherein the graphical user interface displays a list of at least one of available backup files and available objects from the server.

5. The system of claim 1, wherein the mounting at least one of the restored backup files as a server further comprises using a utility file, dsamain.exe, from MICROSOFT.

6. The system of claim 1, wherein the at least one of the selected backup files is restored into a temporary location on a domain controller.

7. The system of claim 1, wherein the server stays online and accessible during the object restore.

8. The system of claim 1, wherein the receiving a selection of at least one of the available objects to be restored from the server further comprises receiving a selection of at least one of an object attribute and an object data to be restored.

* * * * *